(12) United States Patent
Weller et al.

(10) Patent No.: US 11,421,747 B2
(45) Date of Patent: Aug. 23, 2022

(54) CONTROLLING A CLUTCH BY AN ACTUATOR

(71) Applicant: GKN Automotive Ltd., Birmingham (GB)

(72) Inventors: Markus Weller, Kettenhausen (DE); Marcel Richter, Cologne (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 17/437,437

(22) PCT Filed: Mar. 11, 2020

(86) PCT No.: PCT/EP2020/056503
§ 371 (c)(1),
(2) Date: Sep. 9, 2021

(87) PCT Pub. No.: WO2020/182883
PCT Pub. Date: Sep. 17, 2020

(65) Prior Publication Data
US 2022/0178408 A1 Jun. 9, 2022

(30) Foreign Application Priority Data
Mar. 11, 2019 (DE) ...................... 10 2019 106 076.1

(51) Int. Cl.
*F16D 48/06* (2006.01)

(52) U.S. Cl.
CPC .. *F16D 48/064* (2013.01); *F16D 2500/10431* (2013.01); *F16D 2500/5018* (2013.01);
(Continued)

(58) Field of Classification Search
CPC . F16D 2500/70414; F16D 2500/70412; F16D 2500/50233
See application file for complete search history.

(56) References Cited

U.S. PATENT DOCUMENTS 4,836,057 A * 6/1989 Asayama .............. F16D 48/066
477/143
6,481,554 B1 11/2002 Ota et al.
(Continued)

FOREIGN PATENT DOCUMENTS

DE 10065355 C2 11/2002
DE 10 2008 045 627 A1 3/2009
(Continued)

OTHER PUBLICATIONS

German Office Action dated Nov. 5, 2019 for Application No. DE 10 2019 106 076.1 (12 pages; with English machine translation).
(Continued)

*Primary Examiner* — Timothy Hannon
(74) *Attorney, Agent, or Firm* — Bejin Bieneman PLC

(57) ABSTRACT

Controlling a clutch by means of an actuator, wherein at least one first shaft can be torque-transmittingly connected to a second shaft by means of the clutch, the clutch in one of at least three states, where in an disengaged first state, a torque cannot be transmitted, in a second state, a torque can be transmitted such that the speeds of the first shaft and the second shaft are synchronized in the second state, and in an engaged third state, a required torque can be transmitted; wherein, in various states and in an operating mode associated with the particular state, the actuator is adjusted at a different speed in order to adjust the clutch.

8 Claims, 3 Drawing Sheets

(52) U.S. Cl.
CPC ............. *F16D 2500/50233* (2013.01); *F16D 2500/50293* (2013.01); *F16D 2500/70412* (2013.01); *F16D 2500/70414* (2013.01)

(56) References Cited

U.S. PATENT DOCUMENTS

| | | | |
|---|---|---|---|
| 6,502,681 B1 | 1/2003 | Ota et al. | |
| 2009/0292432 A1* | 11/2009 | Suzuki | F16D 29/005 |
| | | | 701/68 |

FOREIGN PATENT DOCUMENTS

| | | |
|---|---|---|
| DE | 10 2009 005 410 A1 | 7/2010 |
| DE | 102012019895 A1 | 4/2014 |
| EP | 1510718 A1 | 3/2005 |
| EP | 1947359 A1 | 7/2008 |
| WO | 2016177945 A1 | 11/2016 |

OTHER PUBLICATIONS

International Search Report and Written Opinion for PCT/EP2020/056503 dated Jun. 22, 2020 (11 pages; with English translation).

\* cited by examiner

CONTROLLING A CLUTCH BY AN ACTUATOR

CROSS-REFERENCE TO RELATED APPLICATIONS

This application is a national stage of, and claims priority to, Patent Cooperation Treaty Application No. PCT/EP2020/056503, filed on Mar. 11, 2020, which application claims priority to German Application No. DE 10 2019 106 076.1, filed on Mar. 11, 2019, which applications are hereby incorporated herein by reference in their entireties.

BACKGROUND

An actuator comprises, for example, an (electrical) drive motor and a control device. An actuator may comprise a ramp mechanism, for example, having a rotatable first disk (adjusting ring) having first ramps (grooves), a second disk (adjusting ring) displaceable only along an axial direction and having second ramps (grooves), and balls disposed in the first ramps and second ramps between the disks, and also at least one spring for displacing the second disk along the axial direction. The rotation of the adjusting ring by the drive motor allows the second disk to be displaced along the axial direction. By means of this displacement along the axial direction, for example, a clutch can be actuated. The drive motor can be connected to the first disk by means of one or multiple gear pairings to transmit a rotational movement.

Particularly in all-wheel-drive systems, a clutch can be used in order to synchronize a speed of a longitudinal shaft with a speed, e.g. of a front axle of a motor vehicle. There may be unwanted noise generation in this case (NVH or noise, vibration, harshness). A reduction in noise generation could hitherto only be achieved through a reduction in the delivery speed of the actuator and therefore of the clutch. However, this measure leads to a loss of time, since the actuator moves the clutch slowly in the region between a mechanical end stop (clutch fully disengaged) and the contact point of the clutch (kiss point, clutch starts to transmit torque) too.

The design of a clutch and an actuator is known from DE 100 65 355 C2, for example. The focus there is for a rapid reverse motion with a damped stop behavior to be performed for the actuator.

It is desirable to improve the comfort of a motor vehicle. In particular, any noises which are audible to passengers of the motor vehicle and operating forces from the drive train that can be felt by them should be reduced or removed wherever possible.

SUMMARY

Herein, a method for controlling an actuator is disclosed, by means of which a further reduction in audible noises or perceptible operating forces is made possible. Accordingly, disclosed herein is a method for controlling a clutch having an actuator, in particular a clutch arranged in a motor vehicle. In particular, the actuator is provided for actuating the clutch, in particular a clutch which acts exclusively by means of friction, e.g. a multi-disk clutch. In particular, the clutch is arranged on a longitudinal shaft connecting two axles of the motor vehicle to one another in a torque-transmitting manner, for example, or on a side shaft of an axle of a motor vehicle. By means of the clutch arranged on a side shaft, by engaging the clutch, the entire axle (the actuated clutch is referred to as a "booster" in this case) or also only one wheel (the actuated clutch is referred to as a "twinster" in this case) of the motor vehicle can be connected to a drive unit of the motor vehicle in a torque-transmitting manner. The actuator can be, in particular, an electromechanical actuator.

As stated above, a method for controlling a clutch having an actuator is disclosed. By means of the clutch, at least one first shaft can be connected to a second shaft in a torque-transmitting manner (clutch engaged: first shaft and second shaft connected in a torque-transmitting manner; clutch disengaged: first shaft and second shaft separated from one another). The clutch can be in one of at least three states, wherein in a disengaged first state, no torque can be transmitted (clutch disengaged), wherein in a second state a torque can be transmitted, such that the speeds of the first shaft and the second shaft are synchronized in the second state, wherein in an engaged third state, a required torque can be transmitted (clutch engaged).

The disclosed method at least comprises the following steps:

a) detecting a required change in the present state in which the clutch is (currently) located;
b) operating the actuator in an operating mode associated with the present state for adjustment of the clutch, wherein the clutch is adjusted from the present state to the required state at a (maximum) speed defined by the operating mode;

and, when the state changes:

c) operating the actuator in a different operating mode associated with the newly existing state for adjustment of the clutch, wherein the clutch is adjusted in the newly existing state at a different (maximum) speed.

It is disclosed that the clutch is adjusted at different speeds in different states. The clutch therefore can be adjusted at an adapted speed depending on the present state of the clutch.

A required change in the present state is detected in accordance with step a). For example, a command is given for a further axle to be added, so, by way of example, a rear axle is to be likewise connected to a drive unit in addition to a front axle. In particular, the level of torque to be transmitted via the clutch is also determined in this case. According to step b), the actuator is then actuated to adjust the clutch. In particular, the state of the clutch is changed at least once, in particular at least twice, until a required (final) state of the clutch can be reached. Accordingly, the speed is changed at least once, possibly at least twice.

A first speed defined in the first state by a first operating mode can be higher than a second speed defined by a second operating mode in the second state.

The clutch can be adjusted at a first (fast) speed, starting from the first state (clutch disengaged, in other words there is no torque-transmitting connection between the first shaft and second shaft). When as the clutch moves to the second state (area of the kiss point, the clutch begins to transmit a torque between the first shaft and the second shaft), the speed is reduced to the second speed. In the second state, the clutch is moved only at the slower second speed.

As a consequence of the method with the slower second speed, noises from the drivetrain, in other words noises from the shafts, the clutch, the actuator, gear pairings, etc., can be significantly reduced.

The clutch or actuator can be adjusted at a constant speed in each state. It is also possible for the clutch or actuator to be adjusted at a varying speed in at least one state (or if warranted in all states), wherein the state or the operating mode of the state can then be assigned a maximum speed. Where there is a varying speed, an arithmetic mean of the speed can be determined where necessary. In this case, particularly for each state, a maximum speed used in the state is relevant and this is observed within the framework of the disclosed method.

Acceleration phases or braking phases can be provided between the states, in which phases the speed of the one state is raised or lowered to the speed of the next state. These acceleration phases or braking phases can be shorter in respect of the time and/or adjustment path compared with the time and/or adjustment path of the respective state. The time (in other words the interval of time) of at least one (or all) acceleration phase(s) or braking phase(s) can be at most 50%, preferably at most 25%, of the time or duration (or interval of time) of the following state. The adjustment path (of the clutch or actuator) of at least one (or all) acceleration phase(s) or braking phase(s) can be at most 50%, preferably at most 25%, of the adjustment path (of the clutch or actuator) provided in the following state.

The different (maximum) speeds in steps b) and c) can differ by at least 10%, preferably by at least 20% or by at least 50%, particularly preferably by at least 75%, from the higher of the observed speeds in each case. The second speed, for example, can be only at most 90%, preferably at most 80% or only at most 50%, particularly preferably only at most 25%, of the first speed.

The third speed defined in the third state by a third operating mode can be higher than a second speed defined in the second state by a second operating mode.

The clutch can be adjusted at a second speed starting from the second state. When as the clutch switches over to the third state (clutch synchronized and engaged, a required torque is transmitted between the first shaft and the second shaft via the clutch) the speed is accelerated to the third speed.

The third speed defined by a third operating mode in the third state can be at least as high as a first speed defined by a first operating mode in the first state. The third speed can be higher than, or even substantially higher than, the first speed.

The third state can be defined in that the shafts connected via the clutch, in other words the first shaft and the second shaft, rotate at the same speed, so that the clutch is synchronized. Starting from the reaching of this third state, the clutch can be further adjusted at a third speed. This third speed can be a nominal speed of the actuator, in other words the maximum settable speed of the actuator.

The actuator is typically an electromechanical actuator. An actuator of this kind comprises, e.g. an (electrical) drive motor and a control device. An actuator may have a ramp mechanism, for example, with a rotatable first disk (adjusting ring) which has first ramps (grooves), a second disk (adjusting ring) which can only be displaced along an axial direction and has second ramps (grooves), and balls which are arranged in the first ramps and second ramps between the disks, and also at least one spring for the displacement of the second disk along the axial direction. Through rotation of the first disk by the drive motor, the second disk can be displaced along the axial direction. The clutch can be actuated by means of this displacement along the axial direction. The drive motor may be connected to the first disk via one or multiple gear pairings to transmit a rotational movement.

The speed of the actuator can be indicated in tics per second and is proportionate to the delivery speed of the second disk (and therefore the clutch linings which are to be brought into contact with one another) in the translatory direction when the gradient of the ramps of the actuator is constant. A tics unit describes a rotation of the drive motor of the actuator about a particular angular range, in other words the rotation of the disks in respect of one another or only the first disk. In particular, for a rotation of the one disk in respect of the other disk through 360 angle degrees between 30 and 50 tics are necessary, e.g., between 40 and 45 tics. A rotation of the disks in respect of one another through 360 angle degrees can cause a translational displacement of the second disk by 0.1 to 3.0 millimeters, preferably by 0.5 to 1.5 millimeters.

The second speed can be at least 300 tics/second, preferably at least 450 tics/second. The second speed can be at most 2000 tics/second, preferably at most 1500 tics/second, particularly preferably at most 1000 tics/second. The third speed can be higher than the second speed and/or it can be at least 2000 tics/second, preferably at least 2500 or even at least 3000 tics/second. The first speed can correspond to the third speed at most and is higher than the second speed.

The delivery speed of the second disc in meters per second [m/s] can be determined from the rotational speed of the first disk in tics per second [tics/s]. The following equation can be used for this:

$$((180/\pi)*(1/8.5714))/(\text{transmission ratio}*\text{ball-ramp transmission}).$$

The term "$180/\pi$" allows for the conversion of radians into degrees and the term "$1/8.5714$" the conversion of degrees into tics. The equation results in the translation of tics/s into m/s.

A range of 42 to 76 for the gear transmission and a range of 740 to 848 for the ball-ramp transmission, for example, can be applied.

These values result in a conversion factor from $2.1507*10^{-4}$ (for gear transmission 42 and ball-ramp transmission 740) to $1.0372*10^{-4}$ (for gear transmission 76 and ball-ramp transmission 848).

For a rotational speed of 3000 tics/sec therefore results in a delivery speed of the second disk of 0.64521 m/s (for the factor $2.1507*10^{-4}$) to 0.31117 m/s (for the factor $1.0372*10^{-4}$).

The method can be used only when engaging the clutch, in other words starting from the first state and at least to the second state, possibly up to the third state. The method may, however, also be used when disengaging the clutch (in other words starting from the third state to the second state, where necessary up to the first state).

The first state can be limited by a (mechanical) end stop of the clutch, possibly of the actuator. Starting from this end stop, the actuator or the clutch can be adjusted or moved to the second state.

The second state can include the kiss point of the clutch. In this state, the speeds of the shafts to be connected to one another are synchronized. Components of the clutch are thereby successively brought into torque-transmitting contact with one another, so that the smoothest possible coupling of the shafts can be brought about. It is possible that only this region of the adjustment path of the clutch is passed through at a slower speed, so that the reaction time of the clutch, or the time for connecting or separating the shafts, is only extended to a negligible degree. By contrast, a reduction in noises from the drive train can thereby be achieved, without an increase in the reaction time of the clutch having to be accepted.

At least one position of the actuator, at which there is a changeover from the first state to the second state, can be calibrated depending on wear to the clutch. Calibrated in this sense means that the changing position which depends on wear to the clutch is detected and this change in position is taken into account in the subsequent actuations of the clutch.

In this way, the positions of the actuator, in other words the positions which the actuator controls and which are assigned to specific adjustment paths of the clutch, can be adjusted continuously or gradually over the running time of the clutch or of a motor vehicle.

A delivery path of the clutch, which is changed by wear to said clutch and is required in order to pass through a state, can be taken into account by a change in speed which is defined by the operating mode associated with the state, so that the state can be passed through in an interval of time independent of wear.

It is desirable that a change in the control of a clutch should not at any time be discernible for a user of a motor vehicle.

Wear to the clutch, a reduction in the thickness of friction linings, for example, customarily results in an adjustment path, which is necessary for engagement of the clutch (starting from an end stop in the first state of the clutch), being lengthened. This lengthening of the adjustment path has hitherto led, in particular, to a delayed establishment of the torque-transmitting connection of the shafts.

It is therefore disclosed that this wear-dependent change in the delivery path should be taken into account by regulating speed. Since in this case an increase in the first speed, for example, is necessary over the running time, this increase should be taken into account at the start of the clutch running time. The first speed of a brand new clutch should therefore be set lower than a maximum possible speed so that a wear-dependent change over the running time of the clutch remains possible.

Apart from a first operating mode assigned to the first state, a second operating mode assigned to the second state, and a third operating mode assigned to the third state, there is at least a fourth operating mode with a defined speed. Further stages with a different speed in each case are preferably provided, so that noise-generating influencing factors can be taken into account where necessary through an adapted control of the clutch by the actuator.

In addition to the method disclosed herein, a motor vehicle is disclosed, at least comprising a drive unit (e.g. an internal combustion engine and/or an electric machine) for driving the motor vehicle, a first shaft driven by the drive unit, and also a second shaft driving at least one wheel, a clutch connecting the shaft in a switchable manner, and an actuator for actuating the clutch. The actuator can be operated by means of a control device, wherein the control device is suitable for implementing the method as described, or can carry it out or carries it out.

The motor vehicle has a first axle that can be driven by the drive unit (particularly permanently) and a second axle, wherein the second axle can be (switchably) connected to the drive unit in a torque-transmitting manner via the clutch.

The first axle can preferably be coupled with the second axle by means of a longitudinal shaft, wherein the clutch is arranged for the switchable connection of the first axle and the longitudinal shaft.

The actuator is provided for actuating the clutch, in particular a clutch which acts exclusively by means of friction, e.g. a multi-disk clutch. The clutch is preferably arranged on a longitudinal shaft connecting two axles of the motor vehicle to one another in a torque-transmitting manner, for example, or on a side shaft of an axle of a motor vehicle. By means of the clutch arranged on a side shaft, by engaging the clutch, the entire axle (the actuated clutch is referred to as a "booster" in this case) or also only one wheel (the actuated clutch is referred to as a "twinster" in this case) of the motor vehicle can be connected to a drive unit of the motor vehicle in a torque-transmitting manner. The actuator can be an electromechanical actuator.

The method may also be implemented by a computer or using a processor of a control device.

A system is also disclosed which comprises a processor that is adapted/configured in such a manner that it implements the method or some steps of the disclosed method.

A computer-readable storage medium can be provided which includes commands which, when implemented by a computer/processor, trigger said computer/processor to implement the method or at least some of the steps of the disclosed method.

The comments relating to the method can be transferred to the motor vehicle or the computer-implemented method, in particular, and vice versa.

For the avoidance of doubt, it should be noted that the key words used herein ("first", "second", ...) are used primarily (only) to distinguish multiple identical objects, sizes or processes, so in particular they do not necessarily specify any dependence and/or a sequence of these objects, sizes or processes in relation to one another. Should dependence and/or a sequence be necessary, this is explicitly indicated herein or it will be evident to the person skilled in the art when they study the specific description of the embodiment.

BRIEF SUMMARY OF THE DRAWINGS

The invention and the technical environment are explained in greater detail below with the help of the figures. It should be pointed out that the invention is not intended to be limited by the exemplary embodiments shown. In particular, unless expressly stated otherwise, it is also possible for partial aspects of the circumstances explained in the figures to be extracted and combined with other constituent parts and knowhow from the present description and/or figures. The same reference symbols denote the same objects, so that explanations from different figures can be included in addition where necessary. The following is shown schematically in the drawings.

DETAILED DESCRIPTION

Figure 1:
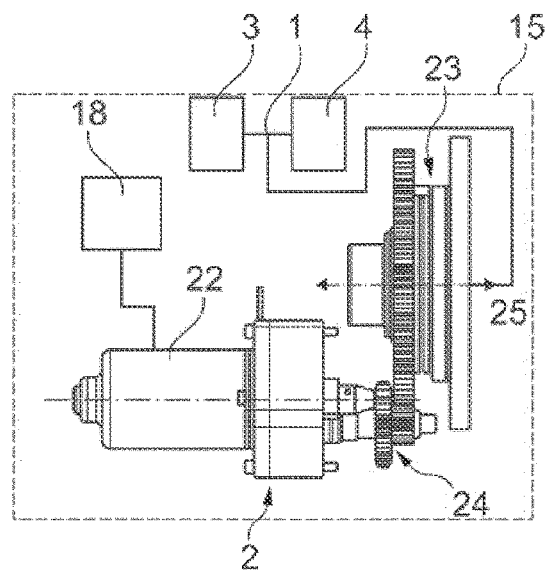
FIG. 1 illustrates a motor vehicle having a clutch and an actuator in a side view and also a control device.

FIG. 1 shows a motor vehicle 15 having a clutch 1, an actuator 2 in side view, and a control device 18.

The actuator 2 comprises an electrical drive motor 22 and a control device 18, a ramp mechanism 23 and a transmission 24. A rotational movement of the drive motor 22 is transmitted via the gear ratio 24 (the gear pairings) to the ramp mechanism 23. By means of the ramp mechanism 23, the rotational movement of the drive motor 22 is converted into a displacement 25 along an axial direction. The displacement 25 is used to actuate the clutch 1. The clutch 1 is used for the torque-transmitting connection of the drive unit 16 and at least one component of the drivetrain (first axle 19, second axle 20, transmission, side shaft, longitudinal shaft 21) to drive the wheels 17 of the motor vehicle 15.

Figure 2:
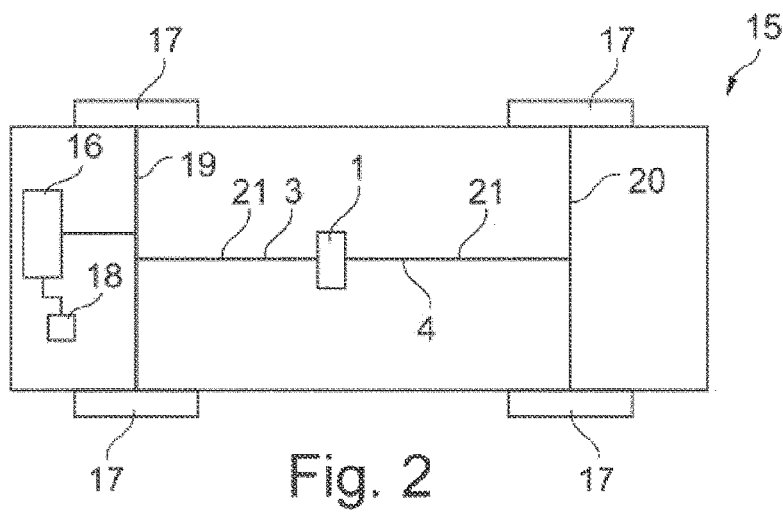
FIG. 2 illustrates a motor vehicle.

FIG. 2 shows a motor vehicle 15, having a control device 18, a drive unit 16 (e.g. an internal combustion engine or an electric machine), a first axle 19 permanently driven by the drive unit 16, a longitudinal shaft 21 that can be connected by means of the clutch 1, and a second axle 20 that can be driven by means of the longitudinal shaft 21, and also having wheels 17 which are arranged on the respective axles 19, 20.

Figure 3:
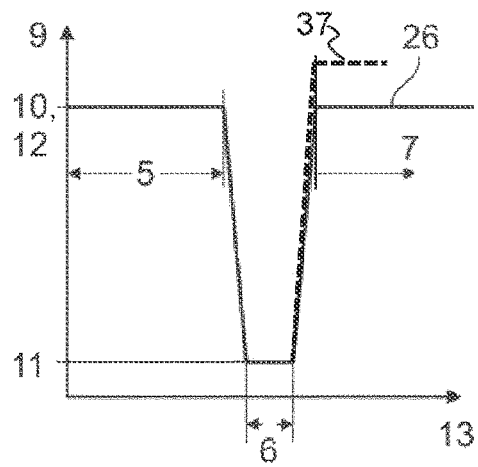
FIG. 3 illustrates a first graph.

FIG. 3 shows a first graph. The position 13 of the actuator 2 is depicted on the horizontal axis (in this case in tics, in other words units which correspond to a rotation of the drive motor 22 of the actuator 2 about angle ranges, and therefore a displacement 25 of the clutch 1 or a delivery path of the clutch 1). The speed 9 of the actuator 2 is depicted on the vertical axis (in this case in tics per second).

The first curve 26 therefore shows the change in speed 9 as a function of the present state 5, 6, 7 of the clutch 1. The clutch 1 is moved successively starting from an end stop (at position "0" of position 13), e.g. of the actuator 2, until the clutch 1 reaches an engaged state, the third state 7. Through a further method in the third state 7, a successively greater torque 8 can be transmitted via the clutch 1.

The clutch 1 in this case is can be in one of three states 5, 6, 7. In a disengaged first state 5, no torque 8 can be transmitted (clutch 2 disengaged). In a second state 6, a torque 8 can be transmitted, such that the speeds of the first shaft 19 and the second shaft 20 are synchronized in the second state 6. In an engaged third state 7, a required torque 8 can be transmitted (clutch 2 engaged).

Detection of a required change in the present state (in this case first state 5) in which the clutch 1 is located takes place in accordance with step a). Operation of the actuator 2 in an operating mode associated with the present state 5, 6, 7 for adjustment of the clutch 1, wherein the clutch 1 is adjusted from the existing first state 5 to the required third state 7 at speeds 10, 11, 12 defined by the different operating modes, takes place in accordance with step b). In other words, when as the state 5, 6 changes, operation of the actuator 2 takes place in a different operating mode associated with the newly existing state 6, 7 for adjustment of the clutch 1, wherein the clutch 1 is adjusted in the newly existing state 6, 7 at a different speed 11, 12.

It is evident that in the second state 6, in which the kiss point of the clutch 1 lies, the clutch 1 is moved at a slower second speed 11, while in the first state 5 and in the third state 7 there is a higher speed 9 in each case, wherein the first speed 10 and the third speed 12 in this case are equally fast. The third speed 12 may also be substantially faster than the first speed 10. In this case, the first curve 26 in the region of the third state 7 would run at a higher value of the speed 9 than the third speed 12 as depicted, i.e. starting from the second state 6 the speed 9 would be accelerated from the second speed 11 to a yet higher third speed 12. This curve of the speed 9 is depicted in FIG. 3 as the eleventh curve.

Figure 4:
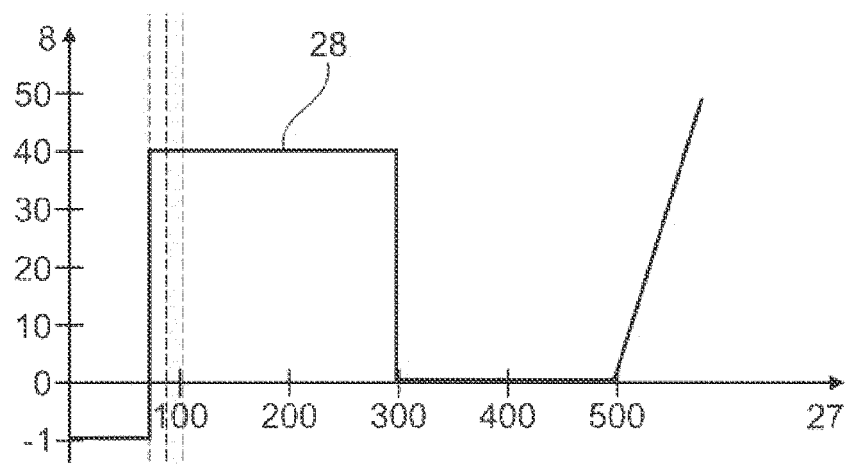
FIG. 4 illustrates a second graph.
Figure 5:
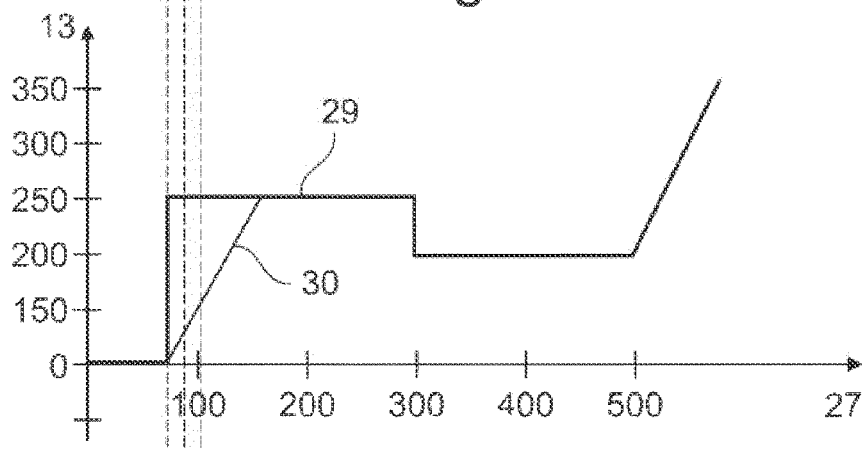
FIG. 5 illustrates a third graph.
Figure 6:
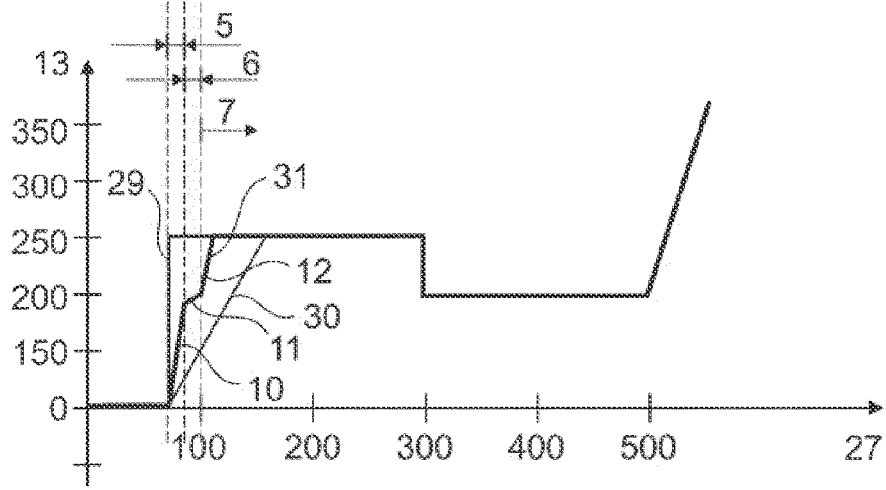
FIG. 6 illustrates a fourth graph.

FIG. 4 shows a second graph. FIG. 5 shows a third graph. FIG. 6 shows a fourth graph. FIGS. 4 to 6 are jointly described below. Reference is made to the comments on FIGS. 1 to 3.

The time 27 (in this case in milliseconds) is plotted on the horizontal axis of the graphs in each case.

The requirement for transmission of a torque 8 (in this case in newton-meters) is plotted on the vertical axis of the second graph (FIG. 4). The second graph shows a second curve 28 of a required torque as a function of time 27.

The position 13 of the actuator 2 required for transmission of the required torque 8 is plotted on the vertical axis of the third graph (FIG. 5) and of the fourth graph (FIG. 6) in each case.

The third graph shows a third curve 29 of a quickest possible adjustment of the clutch 1 (only theoretically possible) and a fourth curve 30 of an intentionally slowed-down adjustment of the clutch 1 over the entire adjustment path as known in the art.

The fourth graph shows in addition to the third curve 29 and the fourth curve 30 a fifth curve 31 disclosed here, in which the actuator 2 is moved at different speeds 10, 11, 12 depending on the position 13.

Figure 7:
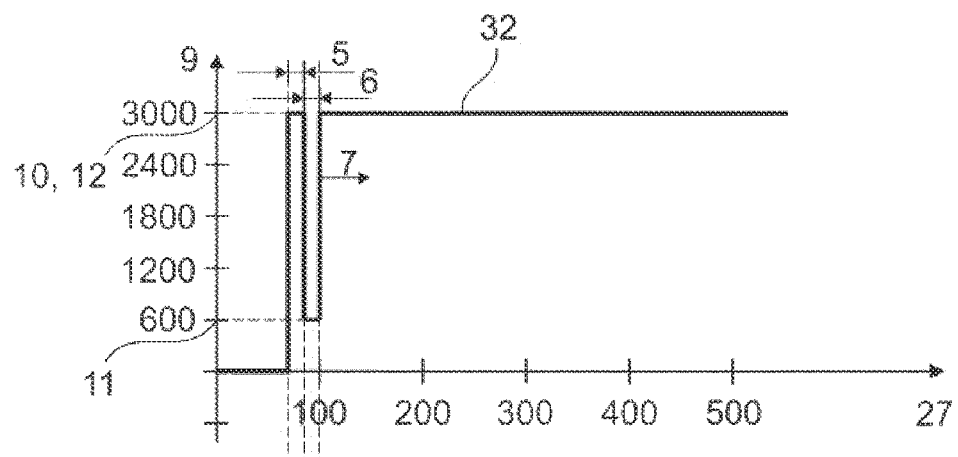
FIG. 7 illustrates a fifth graph.
Figure 8:
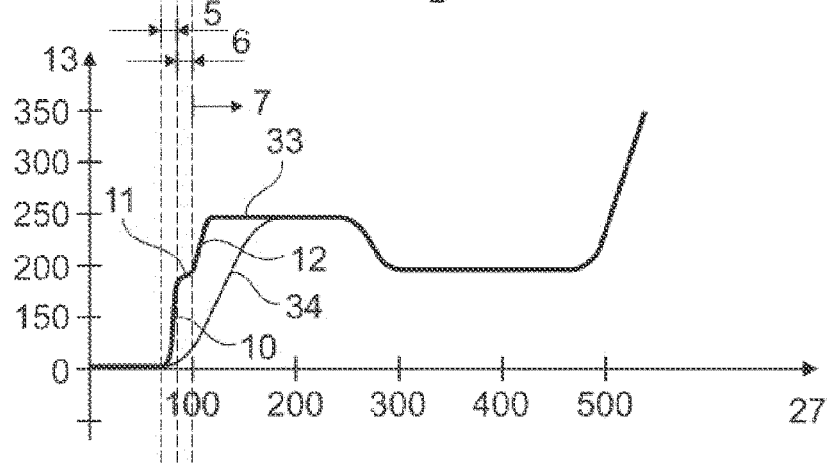
FIG. 8 illustrates a sixth graph.

FIG. 7 shows a fifth graph. FIG. 8 shows a sixth graph. FIGS. 7 and 8 are described jointly below. Reference is made to the comments on FIGS. 4 to 6.

The time 27 (in milliseconds in this case) is plotted on the horizontal axis of each of the graphs.

The speed 9 of the actuator 2 (in tics per second in this case) stored in the control device 18 for the respective state 5, 6, 7 is depicted on the vertical axis of the fifth graph (FIG. 7).

The sixth curve 32 depicted in FIG. 7 shows the values of the speed 9 of the actuator 2 necessary in order to produce the fifth curve 31 depicted in FIG. 6, in which the actuator 2 is moved at different speeds 10, 11, 12 depending on the position 13. The individual values of the speed 9 are stored in a control device 18 for the respective state 5, 6, 7, for example. In the first state 5, the actuator 2 should be moved at a first speed 10, in the second state 6 at a second speed 11, and in the third state 7 at a third speed 12.

It is evident that in the second state 6, in which the kiss point of the clutch 1 lies, the clutch 1 is moved at a slower second speed 11, while in the first state 5 and in the third state 7 there is a higher speed 9 in each case, wherein the first speed 10 and the third speed 12 in this case are equally fast. The third speed 12 may also be substantially faster than the first speed 10 (see FIG. 3).

The position 13 of the actuator 2 required for transmission of the required torque 8 is plotted on the vertical axis of the sixth graph (FIG. 8).

The seventh curve 33 depicted in FIG. 8 shows the actual curve (e.g. measured by sensors) of the adjustment of the actuator 2 against time 27. In this case, the actuator 2 is controlled in such a manner that it is displaced according to the fifth curve 31 (see FIG. 6) where possible.

The eighth curve 34 depicted in FIG. 8 shows the actual curve (e.g. measured by means of sensors) of the adjustment of the actuator 2 against time 27. In this case, the actuator 2 is controlled in such a manner that it is displaced wherever possible in accordance with the fourth curve 30 (see FIG. 6) as known in the art.

The vertical lines entered in FIGS. 4 to 8 illustrate the limits of the individual states 5, 6, 7 (see the labelling in FIGS. 6, 7 and 8).

Figures 9, 10:
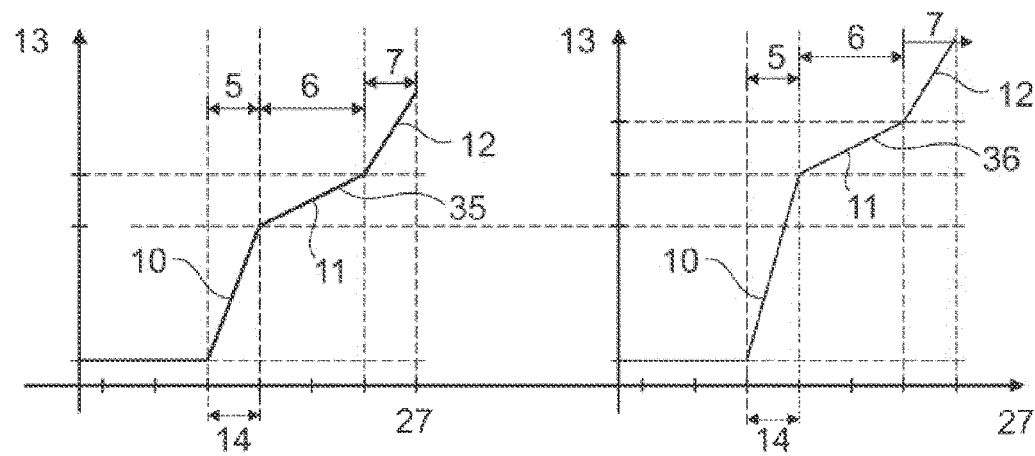
FIG. 9 illustrates a seventh graph.
FIG. 10 illustrates an eighth graph.

FIG. 9 shows a seventh graph. FIG. 10 shows an eighth graph. FIGS. 9 and 10 are described jointly in the following. Reference is made to the comments on FIGS. 5, 6 and 8.

The time 27 (in this case in milliseconds) is plotted on the horizontal axis of the graphs in each case. The position 13 of the actuator 2 necessary in order to transmit the required torque 8 in each case is plotted on the vertical axis of the graphs.

In the seventh graph, a ninth curve 35 depicts the change in the position 13 of the actuator 2 as a function of time 27. In this case, the actuator 2 is adjusted in a first state 5 at a first speed 10.

A position 13 of the actuator 2 in which there is a changeover from the first state 5 to the second state 6 is calibrated depending on wear to the clutch 1. Calibrated in this case means that the changing position 13 which depends on wear to the clutch 1 is detected and this change in positon 13 is taken into account in the subsequent actuations of the clutch 1. This situation is illustrated in FIGS. 9 and 10.

In FIG. 10 a tenth curve 36 shows the change in position 13 of the actuator 2 as a function of time 27. By comparison with FIG. 9, the position 13 in this case, in which the first state 5 changes into the second state 6, is displaced.

In this case, the actuator 2 is adjusted in a first state 5 at a higher first speed 10 (compared with the first speed 10 according to FIG. 9), so that in spite of wear (and the position 13 in which the second state 6 is reached which is thereby deferred) the clutch 1 passes through the first state 5 in the same (as in FIG. 9) constant interval of time 14, and is thereby actuable for the user overall in an unchanged manner.

Consequently, a delivery path of the clutch 1, which is changed by wear to said clutch 1 and is required in order to pass through the first state 5, can be taken into account by a change in speed 9 (the first speed 10 in this case) which is defined by the operating mode associated with the first state 5, so that the first state 5 can be passed through in an interval of time 14 independent of wear. It is evident that the two speeds 11 are the same in both graphs. The same applies to the third speeds 12. Furthermore, the second speed 11 and the third speed 12 in each graph are different from one another.

It can thereby be guaranteed that a change in the control of a clutch 1 is at no time discernible for a user of a motor vehicle 15.

LIST OF REFERENCE NUMBERS 1 clutch
2 actuator
3 first shaft
4 second shaft
5 first state
6 second state
7 third state
8 torque
9 speed
10 first speed
11 second speed
12 third speed
13 position
14 interval of time
15 motor vehicle
16 drive unit
17 wheel
18 control device
19 first axle
20 second axle
21 longitudinal shaft
22 drive motor
23 ramp mechanism
24 transmission
25 displacement
26 first curve
27 time
28 second curve
29 third curve
30 fourth curve
31 fifth curve
32 sixth curve
33 seventh curve
34 eighth curve
35 ninth curve
36 tenth curve
37 eleventh curve

The invention claimed is:

1. A method for controlling a clutch having an actuator, wherein via the clutch at least one first shaft is connectable to a second shaft in a torque-transmitting manner,
   wherein the clutch is in one of at least three states,
   wherein in a disengaged first state, no torque can be transmitted,
   wherein in a second state a torque can be transmitted, such that a speed of the first shaft and a speed of the second shaft are synchronized in the second state, and
   wherein in an engaged third state, a required torque can be transmitted,
   the method comprising:
   a) detecting a required change in a current state of the clutch;
   b) operating the actuator in an operating mode associated with the current state for adjustment of the clutch, wherein the clutch is adjusted from the current state to a next state at a speed defined by the operating mode; and, upon a change from the current state to the next state:
   c) operating the actuator in a different operating mode associated with the next state for adjustment of the clutch, wherein the clutch is adjusted in the next state at a different speed;
   wherein the current state of the clutch is one of the first state, the second state, or the third state, and the next state of the clutch is one of the first state, the second state, or the third state, and different from the current state of the clutch;
   wherein the operating mode associated with the current state, and the different operating mode associated with the next state for adjustment of the clutch, are each one of a first, second, or third operating mode;
   wherein a first engagement speed of the clutch, defined in the first state by the first operating mode, is higher than a second engagement speed of the clutch defined by the second operating mode in the second state;
   wherein a third engagement speed of the clutch, defined in the third state by the third operating mode, is higher than the second engagement speed and is at least equal to the first engagement speed; and
   wherein a delivery path of the clutch, which is changed by wear to the clutch and that is required in order to pass through a state, is taken into account by a change in engagement speed which is defined by the operating mode associated with the state, so that the state can be passed through in an interval of time independent of wear.

2. The method of claim 1, wherein at least one position of the actuator at which there is a changeover from the current state to the next state is calibrated according to wear to the clutch.

3. The method of claim 1, wherein apart from the first, second, and third operating modes, there is at least a fourth operating mode with an engagement speed defined for the fourth operating mode.

4. A system for a motor vehicle, comprising:
   a drive unit for driving the motor vehicle;
   a first shaft driven by the drive unit;
   a second shaft driving at least one wheel;

a clutch connecting the shafts in a switchable manner; and
an actuator for actuating the clutch;
wherein the clutch is in one of at least three states,
wherein in a disengaged first state, no torque can be transmitted,
wherein in a second state a torque can be transmitted, such that a speed of the first shaft and a speed of the second shaft are synchronized in the second state, and
wherein in an engaged third state, a required torque can be transmitted; and
wherein the actuator is operable by a control device that is configured for:
a) detecting a required change in a current state of the clutch;
b) operating the actuator in an operating mode associated with the current state for adjustment of the clutch, wherein the clutch is adjusted from the current state to a next state at a speed defined by the operating mode; and, upon a change from the current state to the next state:
c) operating the actuator in a different operating mode associated with the next state for adjustment of the clutch, wherein the clutch is adjusted in the next state at a different speed;
wherein the current state of the clutch is one of the first state, the second state, or the third state, and the next state of the clutch is one of the first state, the second state, or the third state, and different from the current state of the clutch;
wherein the operating mode associated with the current state, and the different operating mode associated with the next state for adjustment of the clutch, are each one of a first, second, or third operating mode;
wherein a first engagement speed of the clutch, defined in the first state by the first operating mode, is higher than a second engagement speed of the clutch defined by the second operating mode in the second state;
wherein a third engagement speed of the clutch, defined in the third state by the third operating mode, is higher than the second engagement speed and is at least equal to the first engagement speed; and
wherein the control device is further configured such that a delivery path of the clutch, which is changed by wear to the clutch and that is required in order to pass through a state, is taken into account by a change in engagement speed which is defined by the operating mode associated with the state, so that the state can be passed through in an interval of time independent of wear.

5. The system of claim 4, wherein the motor vehicle has a first axle drivable by the drive unit and a second axle, and wherein the second axle is connectable to the drive unit in a torque-transmitting manner via the clutch.

6. The system of claim 4, wherein the first axle can be coupled with the second axle by a longitudinal shaft, wherein the clutch is arranged for the switchable connection of the first axle and the longitudinal shaft.

7. The system of claim 4, wherein the control device is further configured such that at least one position of the actuator at which there is a changeover from the current state to the next state is calibrated according to wear to the clutch.

8. The system of claim 4, wherein the control device is further configured such that apart from the first, second, and third operating modes, there is at least a fourth operating mode with an engagement speed defined for the fourth operating mode.

* * * * *